US012157319B2

(12) United States Patent
Sato

(10) Patent No.: US 12,157,319 B2
(45) Date of Patent: Dec. 3, 2024

(54) INFORMATION PROCESSING APPARATUS, METHOD OF CONTROLLING INFORMATION PROCESSING APPARATUS AND STORAGE MEDIUM

(71) Applicant: CANON KABUSHIKI KAISHA, Tokyo (JP)

(72) Inventor: Junko Sato, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 120 days.

(21) Appl. No.: 17/984,015

(22) Filed: Nov. 9, 2022

(65) Prior Publication Data

US 2023/0158802 A1 May 25, 2023

(30) Foreign Application Priority Data

Nov. 19, 2021 (JP) ................................ 2021-188348

(51) Int. Cl.
*B41J 2/175* (2006.01)

(52) U.S. Cl.
CPC ....... *B41J 2/17566* (2013.01); *B41J 2/17543* (2013.01)

(58) Field of Classification Search
CPC .......................... B41J 2/17566; B41J 2/17543
See application file for complete search history.

(56) References Cited

U.S. PATENT DOCUMENTS 9,753,424 B2 * 9/2017 Kawana ............... G03G 15/553
2016/0292629 A1 * 10/2016 Matsuda .............. G06Q 10/087
2020/0278818 A1 * 9/2020 Osuki .................. G06F 3/1256
2021/0354488 A1 * 11/2021 Nakamura ............ B41J 29/393

FOREIGN PATENT DOCUMENTS

JP 2016-194906 11/2016
JP 2020077207 A * 5/2020

* cited by examiner

*Primary Examiner* — Sharon Polk
(74) *Attorney, Agent, or Firm* — Venable LLP

(57) ABSTRACT

According to an aspect of the present disclosure, an information processing apparatus executes software that obtains and manages information of a printing device, and the information processing apparatus comprises: a requesting unit configured to request a delivery of a cartridge for exchange based on residual amount of recording agent in a cartridge containing the recording agent installed in the printing device, the residual amount being included in first information obtained from the printing device by using the software; and a control unit configured to perform, when initially obtaining a residual amount of recording agent from the printing device after booting the software or the information processing apparatus, controlling to output a message for checking whether the requesting is necessary if the requesting has not been performed in response to detecting a cartridge having an increased residual amount compared to a previously obtained residual amount of recording agent.

7 Claims, 10 Drawing Sheets

FIG. 10A

| FLAG UPDATE TIME | TYPE | DELIVERY-COMPLETED FLAG |
|---|---|---|
| 2020/05/01 17:05 | C | OFF (0) |
| 2020/04/15 17:05 | M | ON (1) |
| 2020/05/27 09:22 | Y | OFF (0) |
| 2020/03/20 17:05 | Bk | OFF (0) |

FIG. 10B

TONER RESIDUAL AMOUNT MANAGEMENT TABLE (DEVICE A)

| DEVICE ID | OBTAINED DATE AND TIME | TYPE OF TONER BOTTLE | RESIDUAL AMOUNT [%] | OBTAINED TIMING | LATEST COUNTER | DIFFERENCE OF COUNTERS | DELIVERY CONFIRMATION FLAG |
|---|---|---|---|---|---|---|---|
| Device-A | 2020/05/21 17:00 | TTR-1 Y | 60 | PERIODIC | 5100 | 200 | OFF (0) |
| | | TTR-1 M | 25 | | | | OFF (0) |
| | | TTR-1 C | 55 | | | | OFF (0) |
| | | TTR-1 K | 100 | | | | OFF (0) |
| | 2020/05/24 09:00 | TTR-1 Y | 35 | ON BOOT | 5750 | 650 | OFF (0) |
| | | TTR-1 M | 95 | | | | ON (1) |
| | | TTR-1 C | 20 | | | | OFF (0) |
| | | TTR-1 K | 70 | | | | OFF (0) |
| | 2020/05/24 17:00 | TTR-1 Y | 30 | PERIODIC | 5900 | 150 | OFF (0) |
| | | TTR-1 M | 90 | | | | OFF (0) |
| | | TTR-1 C | 15 | | | | OFF (0) |
| | | TTR-1 K | 65 | | | | OFF (0) |

INFORMATION PROCESSING APPARATUS, METHOD OF CONTROLLING INFORMATION PROCESSING APPARATUS AND STORAGE MEDIUM

BACKGROUND

Field

The present invention relates to an information processing apparatus and a method of controlling the information processing apparatus and a storage medium.

Description of the Related Art

It is known that there have been centralized management servers that monitor image forming apparatuses (print apparatuses) installed in customer's places through a network, and a management server PC installed in each customer's place. These management servers acquire the remaining (residual) amount of toner from the image forming apparatus to be monitored. There is a service that instructs to deliver a new toner bottle for the image forming apparatus when detecting that the residual amount of toner reaches a certain threshold. The image forming apparatus has a function of calculating an estimated value of the residual amount of toner every time an image is formed since the toner bottle is mounted, and displaying the calculated value as a current value of the residual amount of toner on a panel or the like, or transmitting the current value of the residual amount of toner to a management server. According to the services like the above, new toner bottles are automatically delivered to users of the image forming apparatus before needed to replace old bottles. Therefore, the above services allow the users to save some trouble of monitoring the residual amount of toner bottle of the image forming apparatus to order a new toner bottle (see, for example, Japanese Patent Application Laid-Open No. 2016-194906).

However, in the case of a system where a management server PC installed in a customer's place acquires a residual amount of toner from an image forming apparatus and instructs to deliver a replacement bottle, the management server PC may not be in operation for a period of time due to a powered-off state, etc. Even if the residual amount of toner of the monitored image forming apparatus reaches a threshold for delivery, the management server PC cannot detect that fact during such a period. During periods when such a management server PC is not running, the user may replace an old toner bottle with a new toner bottle. In this case, even if the management server PC is booted again and the residual amount of toner is known to the image forming apparatus, the residual amount of toner no longer reaches the delivery threshold, and there is a possibility that the delivery of the replacement bottle is missed or omitted. Although a toner bottle is described here as an example, this is a common problem in the management of a printing apparatus using a cartridge containing a recording agent such as toner and ink.

The present invention has been made in order to solve the above problems. An object of the present invention is to provide a mechanism capable of preventing omission of delivering a cartridge containing recording agent such as a toner bottle and an ink cartridge.

SUMMARY

According to an aspect of the present disclosure, an information processing apparatus executes software that obtains and manages information of a printing device, and the information processing apparatus comprises: a requesting unit configured to request a delivery of a cartridge for exchange based on residual amount of recording agent in a cartridge containing the recording agent installed in the printing device, the residual amount being included in first information obtained from the printing device by using the software; and a control unit configured to perform, when initially obtaining a residual amount of recording agent from the printing device after booting the software or the information processing apparatus, controlling to output a message for checking whether the requesting is necessary if the requesting has not been performed in response to detecting a cartridge having an increased residual amount compared to a previously obtained residual amount of recording agent.

According to the present disclosure, delivery oversight (omission) of cartridges for recording agent such as toner bottles and ink cartridges can be prevented.

Further features of the present invention will become apparent from the following description of exemplary embodiments with reference to the attached drawings.

BRIEF DESCRIPTION OF THE DRAWINGS

FIG. 10A shows an example of the management table managed by the management server PC.

FIG. 10B shows an example of the management table managed by the management server PC.

DESCRIPTION OF THE EMBODIMENTS

The embodiments of the present invention will now be described with reference to the drawings. The following embodiment does not limit the present invention recited in claims, and not all of the combinations of features described in the embodiment are essential for achieving the objective of the invention.

First Embodiment

Figure 1:
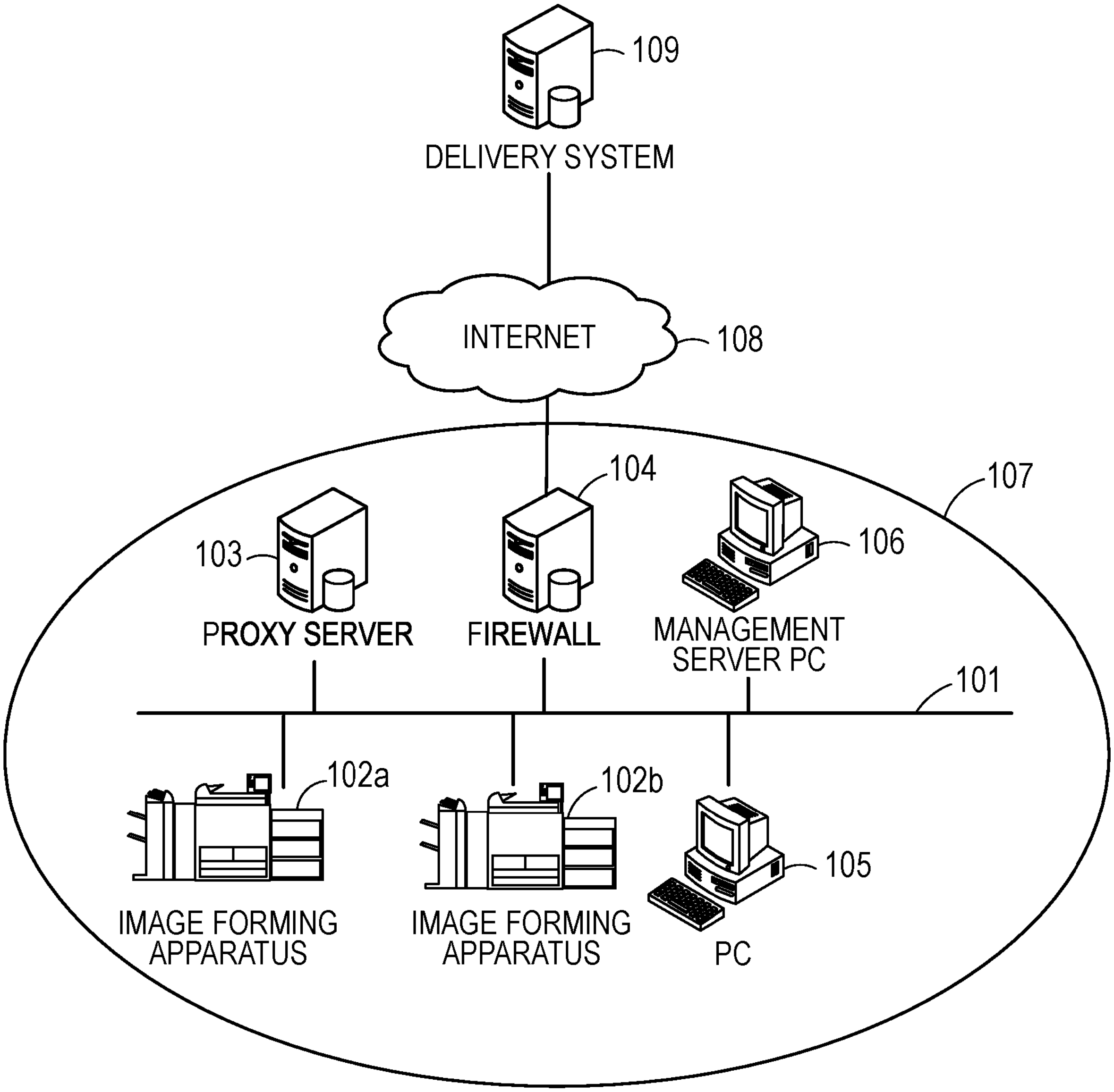
FIG. 1 shows an example of the overall configuration of the management system according to the present embodiment.

FIG. 1 shows an example of the overall configuration of the management system according to the present embodiment.

The symbol 107 represents an intranet environment in which an image forming apparatus 102, a proxy server 103, a firewall 104, a PC 105, and a management server PC 106 are interconnected via a local area network (LAN) 101.

The LAN 101 represents a local area network under a customer environment. In the management system according to the present embodiment, one or more image forming apparatuses 102 (in the example of FIG. 1, an image forming apparatus 102*a* and an image forming apparatus 102*b*) are installed as monitored print apparatus under the same customer environment.

The proxy server 103 relays the intranet and an internet 108.

The firewall 104 is installed to enhance the security of the intranet.

The PC 105 is a personal computer used by a general user in business.

The management server PC 106 is an information processing apparatus that unitarily manages the operation states of one or more image forming apparatuses 102 installed in a customer environment, collects operation information, and arranges maintenance in the event of failure of the image forming apparatus. The management server PC 106 also manages the inventory status of the expendable supplies of the image forming apparatus 102 at the customer, and automatically arranges the delivery of new expendables to the customer when necessary.

The delivery system 109 is, for example, a delivery system constructed by a sales company. The delivery system 109 instructs delivery of consumables such as toner bottles, ink bottles, cartridges, and other consumables including recording agents, and consumables such as parts that wear every time they are used, to the customer based on various information notified from the management server PC 106 by mail or the like. In the present embodiment, a toner bottle will be described as an example of a cartridge containing a recording agent which is a consumable item (a supply item) to be delivered, but the same applies to ink cartridges and other cartridges.

The delivery system 109 is in fact interconnected with multiple intranet environments 107 via the Internet 108.

Figure 2:
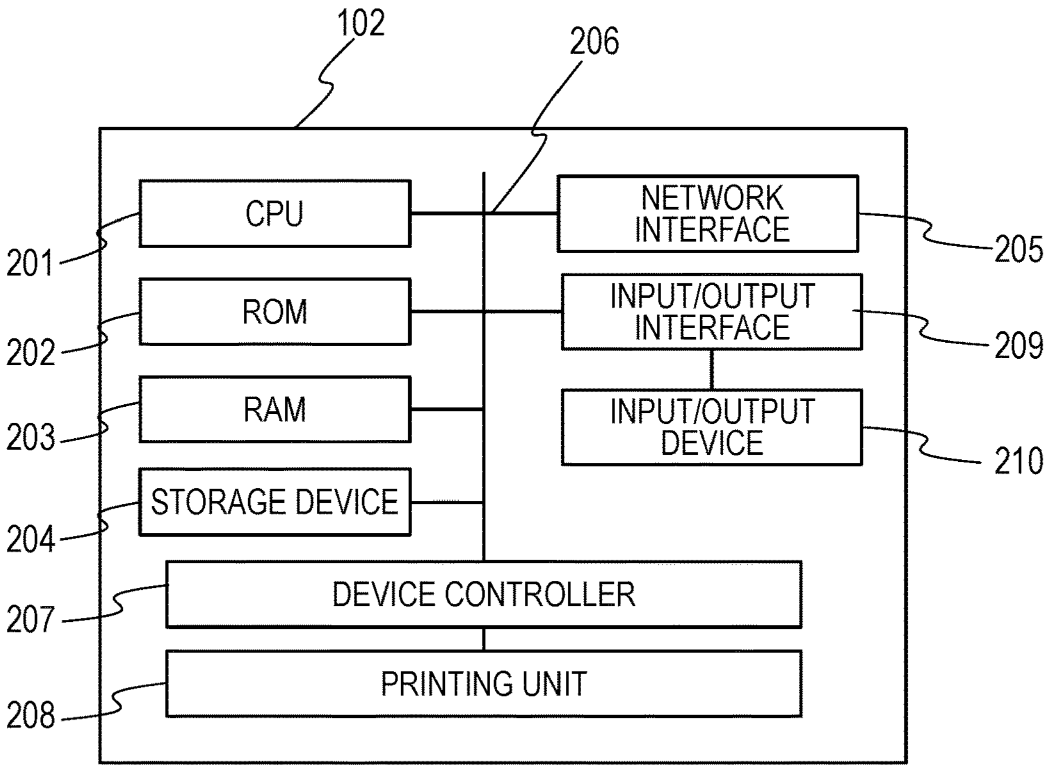
FIG. 2 shows an exemplary hardware configuration of the image forming apparatus.

FIG. 2 illustrates the hardware configuration of the image forming apparatus 102.

The image forming apparatus 102 includes a CPU 201, a ROM 202, a RAM 203, a storage device 204, a network interface 205, an internal bus 206, a device controller 207, a printing unit 208, an input/output interface 209, and an input/output device 210.

The CPU 201 executes a program stored in the ROM 202 or the like and comprehensively controls each device via the internal bus 206. The RAM 203 functions as a memory and a work area of the CPU 201, and stores event information generated in the image forming apparatus 102, various counter information, information on consumption levels of expendables, various logs, and the like.

The CPU 201 executes a program together with the ROM 202 and the RAM 203, and records image data in a recording medium such as the storage device 204. The storage device 204 functions as an external storage device and can store image data or the like, and can also store the event information, various counter information, information on the consumption level of expendables, and various logs in place of the RAM 203.

The network interface 205 exchanges data in one or two directions with external network devices or personal computers via the LAN 101.

The device controller 207 controls the printing unit 208 according to a print request or the like.

The input/output device 210 receives an input (scanning, pressing a button, etc.) from a user and notifies each processing unit of the reception of input via the input/output interface 209.

Figure 3:
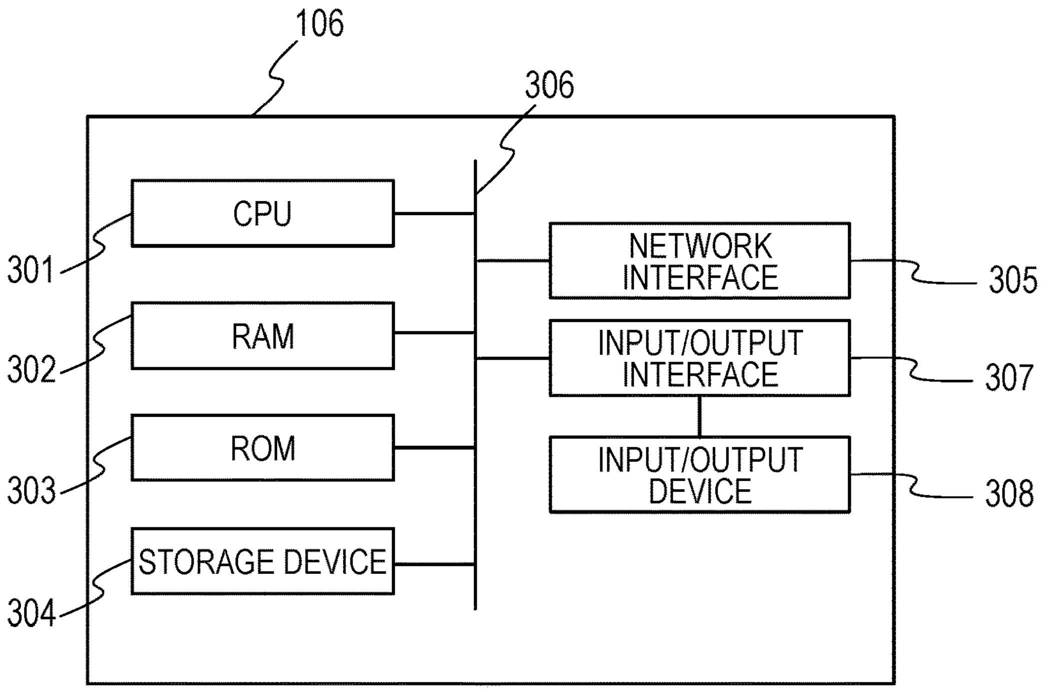
FIG. 3 shows an exemplary hardware configuration of the management server PC.

FIG. 3 is a diagram showing the hardware configuration of the management server PC 106.

The management server PC 106 includes a CPU 301 for executing programs (including programs for implementing the processes of FIGS. 7 to 9, which will be described later) stored in a ROM 303 or a storage device 304 and the like, and comprehensively controls each device via an internal bus 306.

A RAM 302, the ROM 303, the storage device 304, a network interface 305, and an input/output interface 307 are connected to the internal bus 306.

An input/output device 308 is an operation unit such as a keyboard, a CRT display, a liquid crystal display, etc., and can be connected to the management server PC 106 through the input/output interface 307.

The management server PC 106 is connected to the LAN 101 through the network interface 305 and can communicate with the image forming apparatus 102 and the PC 105. The operation information of the image forming apparatus can be collected through the above communications. The management server PC 106 is connected to the internet 108 via the network interface 305, the proxy server 103, and the firewall 104, and can communicate with the delivery system 109. The above communications allow automatic arrangements for delivery of new expendables to customers.

The CPU 301 executes a program together with the RAM 302, the ROM 303, and the storage device 304. The CPU 301 performs processing for recording image data on a recording medium such as the storage device 304.

The storage device 304 functions as an external storage device, and can store programs and operation information of image forming apparatuses 102, and store system information and processing information in place of the RAM 302.

Figure 4:
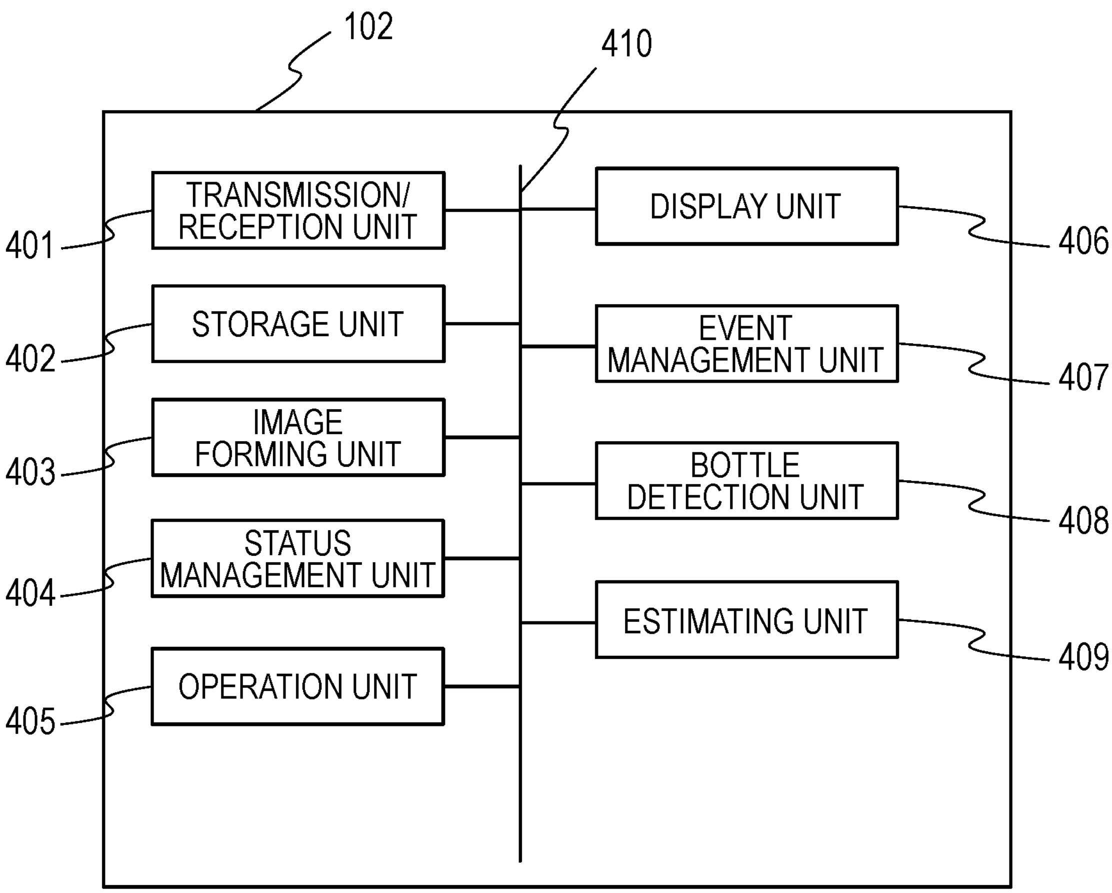
FIG. 4 shows an exemplary software module configuration of the image forming apparatus.

FIG. 4 is a diagram describing an example of the module configuration of the software of the image forming apparatus 102. The components shown in FIG. 4 are implemented and realized by the CPU 201 of the image forming apparatus 102 loading and executing a program stored in the ROM 202 or the like into the RAM 203 as required.

The image forming apparatus 102 has a software configuration including a transmission/reception unit 401, a storage unit 402, an image forming unit 403, a status management unit 404, an operation unit 405, a display unit 406, an event management unit 407, a bottle detection unit 408, an estimating unit 409, and a device interface 410.

The transmission/reception unit 401 acquires information about the image forming apparatus 102 (hereinafter referred to as "device information"), event information generated by the image forming apparatus 102, various counter information, and consumption level information of expendables from the storage device 204. Furthermore, the transmission/reception unit 401 edits various information into a format for transmission to the management server PC 106 in response to requests of acquiring various information from the management server PC 106, and then transmits the edited information to the management server PC 106.

The device information includes identification information (serial number) of the image forming apparatus, network information (IP address), operation information, and the like, and any of the information is used for notification or the like as necessary. The transmission of event information to the management server PC 106 is started after a communication test with the management server PC 106 is performed in a series of installation work at a customer site. The transmission/reception unit 401 also has a function to receive instructions and configuration data sent from the management server PC 106. The transmission/reception is performed using a communication protocol such as HTTP/HTTPS or SNMP.

The storage unit 402 performs storage control such as storing and reading out information in/from the ROM 202, the RAM 203, and the storage device 204. The storage unit 402 stores management information necessary for managing the image forming apparatus. Specifically, for example, device configuration information such as firmware information and an identification number of the image forming apparatus, information of various counters, information on consumption level of expendables, operation history of the image forming apparatus 102, and history information indicating various abnormal states (log data) are also stored. In addition, the device information and information related to the management server PC 106 (hereinafter referred to as "server information") are stored. The server information includes information used for communications, such as address information of the management server PC 106 that manages the image forming apparatus 102.

The image forming unit 403 has a function for generating and outputting print data to be passed to the printing unit 208.

The status management unit 404 controls printing of the image forming apparatus 102, manages abnormal conditions, and manages counter information and notification information. As the counter information, for example, a value obtained via a sensor by counting the number of sheets printed by an image forming apparatus or the like, and information on consumption level indicating a degree of consumption of expendables or the residual amount of content in expendables such as toner bottles are stored and managed in the storage unit 402.

The operation unit 405 is an interface that allows a user to issue operation instructions including a print instruction for the image forming apparatus 102.

The display unit 406 displays to users a user interface (UI) screen such as the status information of the image forming apparatus, information on the consumption rate of various expendables (including the information of residual amounts of toners in the installed toner bottles), and setting information.

The event management unit 407 receives events generated by the image forming apparatus 102 and manages event information. The event information managed by the event management unit 407 includes an event of print job issued by a user of the image forming apparatus, errors (sometimes called failures), and status information of the image forming apparatus. Examples of events handled by the event management unit 407 include a highly urgent error such as a hard disk error or a warning level error such as a paper jam or a low toner level. In addition, events indicating replacement of the toner bottle and firmware updates are similarly notified to the event management unit 407 via the device interface 410.

The bottle detection unit 408 detects through a sensor that the toner bottle has been replaced and notifies the event management unit 407 through the device interface 410. Furthermore, if it is detected that the bottle has been replaced with a new one, the replacement is notified to the estimating unit 409, and a current value of the residual amount of toner corresponding to the replaced color that is managed by the estimating unit 409 is updated to 100%.

The estimating unit 409 has a function of estimating the consumption level of toner bottles, calculates an estimated value of the residual amount of toner every time an image is formed after the toner bottle is replaced with a new toner bottle, and notifies the status management unit 404 of a result of the calculation. The status management unit 404 manages the result as the current value of the residual amount of toner of each color, and stores in the storage unit 402.

Figure 5:
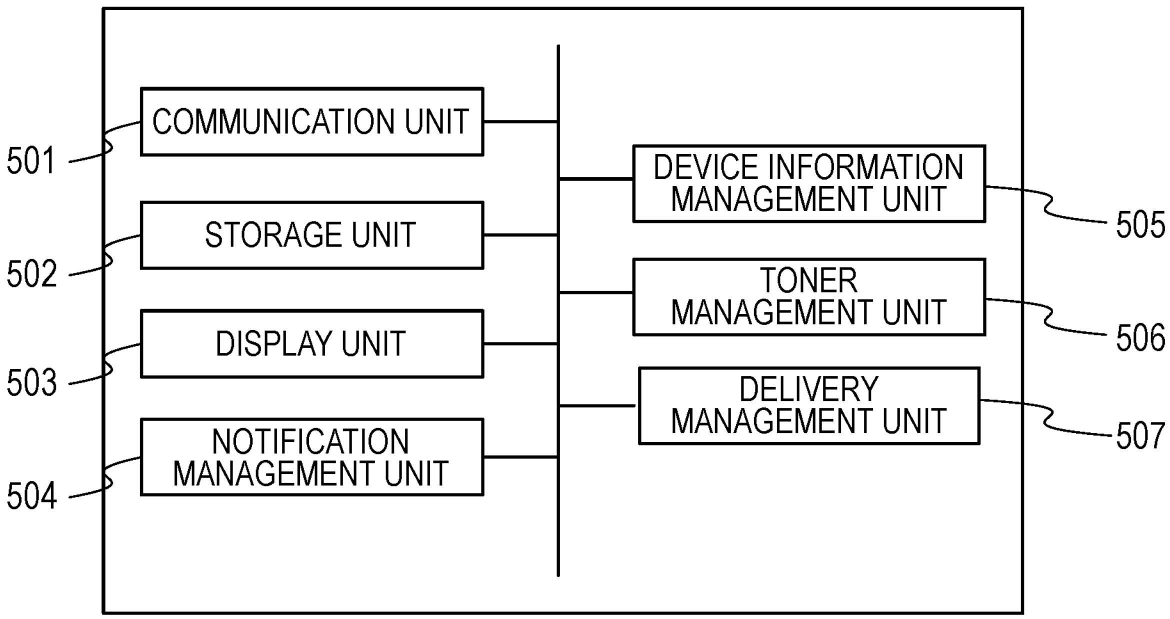
FIG. 5 shows an exemplary software module configuration of the management server PC.

FIG. 5 is a diagram describing the module configuration of the software of the management server PC 106. The components shown in FIG. 5 are implemented and realized by the CPU 301 of the management server PC 106 loading programs stored in the ROM 303, the storage device 304, and the like into the RAM 302 and executing the programs as necessary.

The management server PC 106 has a communication unit 501, a storage unit 502, a display unit 503, a notification management unit 504, a device information management unit 505, a residual toner amount management unit 506, and a delivery management unit 507 as configurations of a monitoring agent which is software.

The communication unit 501 has a function of communicating with the image forming apparatus 102. The communication unit 501 receives status information of the image forming apparatus 102, information on the consumption rate of various expendables (including information of the residual amount of toner), setting information (for example, residual amount of toner and counter information), and event information generated by the image forming apparatus 102.

The storage unit 502 performs control of storing information for the RAM 302, the ROM 303, and the storage device 304. The objective of the storage control in the present embodiment includes device information to be monitored, information of sales companies, customer information, information of the delivery system, and the like.

The display unit 503 displays the device information (for example, the status information of image forming apparatuses, configuration information, etc.) stored in the storage unit 502.

The notification management unit 504 specifies notification contents and notification destinations, and generates notification information. The notification contents include, for example, a notification of maintenance request to a system for arranging a service person to maintain the image forming apparatus 102 (not shown), and a notification of a request to the delivery system 109 for delivery of toner bottles.

The device information management unit 505 manages the device information of the image forming apparatus 102 to be monitored. The information to be managed by the device information management unit 505 includes identification information of the image forming apparatus, status information such as abnormality, and administrator information of the image forming apparatus.

The residual toner amount management unit 506 periodically acquires the residual amount of toner from the image forming apparatus 102 via the communication unit 501, and manages the acquired information in the storage unit 502 using a management table for the residual toner amount as shown in FIG. 10B.

FIG. 10B is an example of the management table for the residual toner amount managed by the residual toner amount management unit 506. This table is employed to manage the types of toner bottles used in image forming apparatus 102, the residual amount of toner periodically acquired from image forming apparatus 102, the latest counter values at the time when the residual amount of toner is acquired, and the difference from the counter values obtained in the previous time.

If the delivery management unit 507 detects that the residual amount of toner acquired from the image forming apparatus has reached a threshold for delivery, the delivery management unit 507 instructs the delivery system 109 to deliver a toner bottle via the notification management unit 504. Specifically, the notification management unit 504 generates a notification for a request of delivering a toner bottle and transmits the notification to the delivery system 109 via the communication unit 501 to give the delivery instructions. The delivery management unit 507 manages states of the delivery instructions of toner bottles being used in the image forming apparatus 102 by using a delivery management table as shown in FIG. 10A.

FIG. 10A is an example of the delivery management table managed by the delivery management unit 507.

This table is used to manage information about whether bottles for replacement have been delivered for the respective colors of toner bottles being used in the image forming apparatus 102. The delivery management table is provided for each print apparatus to be monitored. In the example of FIG. 1, a delivery management table for the image forming apparatus 102*a* and a delivery management table for the image forming apparatus 102*b* are provided.

A delivery-completed flag of the bottle (color) shown in FIG. 10A is changed to "ON (1)" when the delivery management unit 507 instructs the delivery system 109 to deliver toner bottles. If the residual toner amount management unit 506 detects that the toner bottle installed in the image forming apparatus 102 has been replaced with a new toner bottle, the delivery-completed flag is changed to "OFF (0)". Specifically, when the residual toner amount management unit 506 obtains the residual amount of toner from the image forming apparatus 102, the delivery-completed flag is changed to "OFF (0)" if the obtained information includes information indicating that the toner bottle has been replaced with a new one.

Figure 6A:
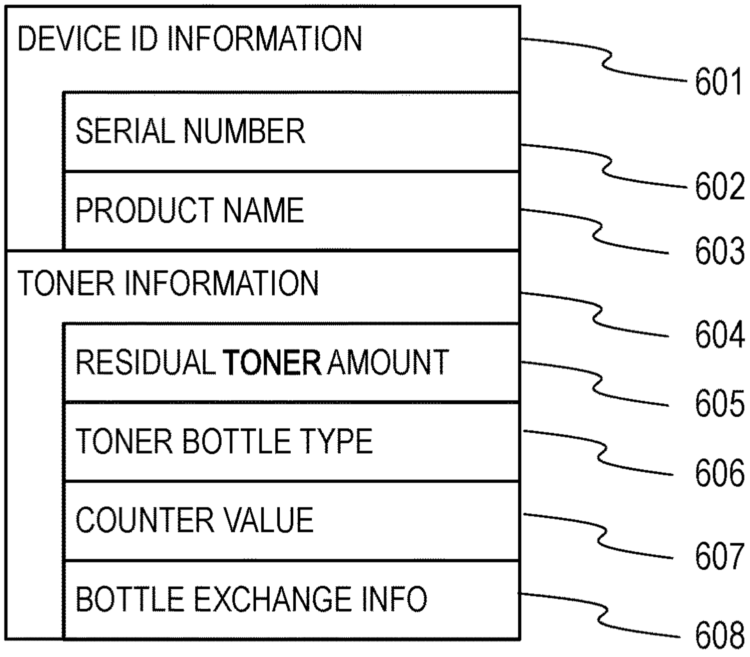
FIG. 6A shows an example of communication data of the device information received by the management server PC from the image forming apparatus.

FIG. 6A is a diagram showing an example of communication data of device information received by the management server PC 106 from the image forming apparatus 102. Here, the information on the residual amount of toner will be described as an example of the device information related to the present embodiment.

The communication data shown in FIG. 6A schematically represents the structure of the event information, and is transmitted from the image forming apparatus 102 to the management server PC 106 via a communication protocol such as HTTPS communications in a format described in XML, format, for example.

As shown in FIG. 6A, the information included in the information on the residual amount of toner composed of device identification information 601 and toner information 604 in general terms.

The device identification information 601 according to the present embodiment is information for identifying the image forming apparatuses, and includes information such as a serial number 602 and a product name 603 of the image forming apparatus 102. The toner information 604 is information on the toner bottles used in the image forming apparatus 102, and includes a residual toner amount 605, a toner bottle type 606, a counter value 607, and bottle exchange information 608.

In a field of the residual toner amount 605, the information on the residual amount of toner of each color in toner bottles being used by the image forming apparatus 102 is stored.

In a field of the toner bottle type 606, information on the types of toner bottles being used by the image forming apparatus 102 is stored.

In a field of the counter value 607, the latest total counter value counted by image forming apparatus 102 is stored.

In a field of the bottle exchange information 608, information on the exchange of the toner bottles installed in the image forming apparatus 102 is stored.

Figure 7:
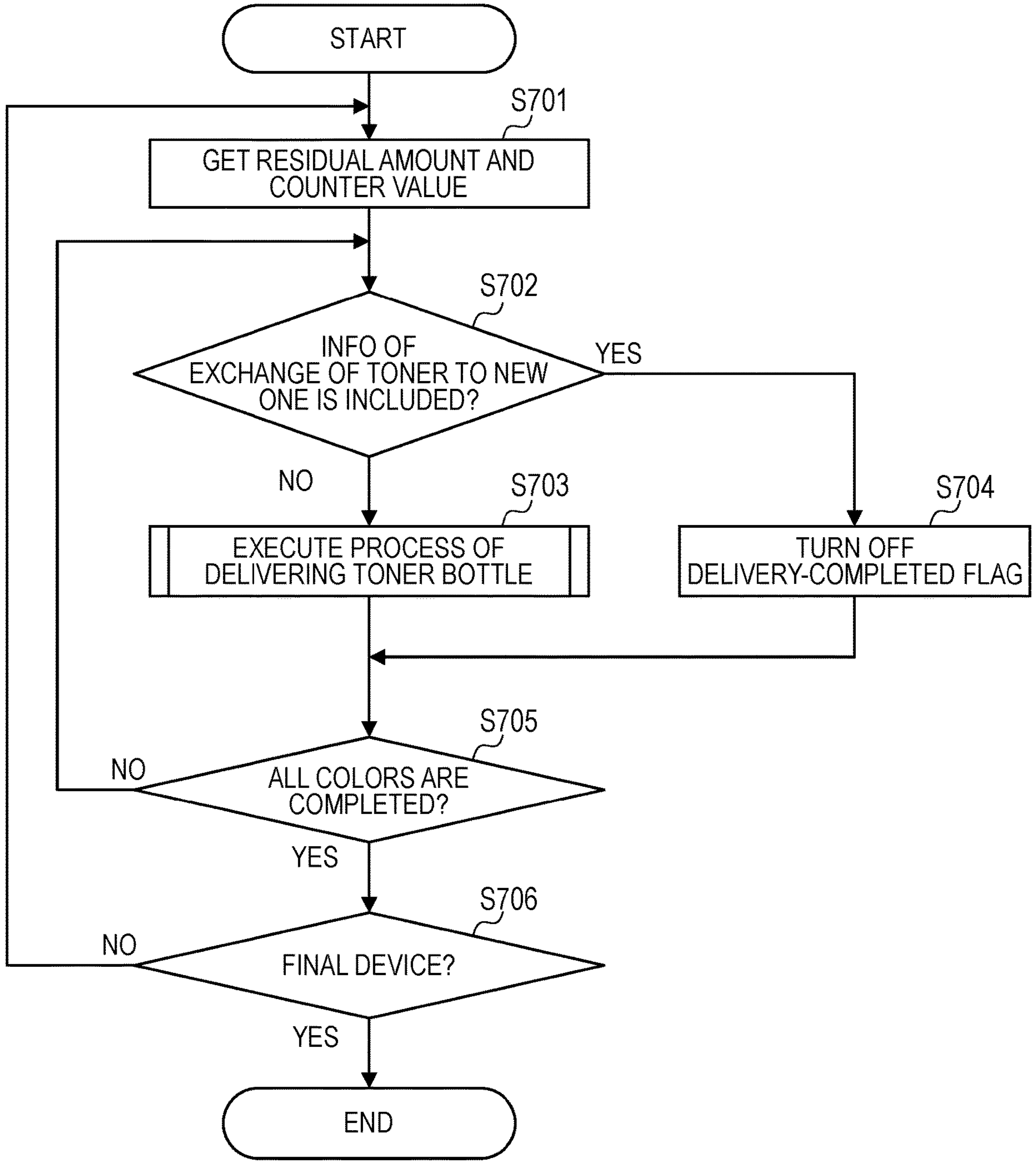
FIG. 7 is a flowchart showing the process of obtaining the residual amount of toner performed by the management server PC.

FIG. 7 is a flowchart showing an example of the processing executed by the residual toner amount management unit 506 of the management server PC 106 for acquiring the residual amount of toner. The processes shown in FIG. 7 and the flowcharts of FIG. 8 and FIG. 9, which will be described later, are implemented by the CPU 301 of the management server PC 106 loading programs stored in the ROM 303, the storage device 304, and the like into the RAM 302 and executing the programs as necessary. The processing in the present flowchart is periodically (for example, once a day) performed by the residual toner amount management unit 506. The processing is also performed when the management server PC 106 is booted.

First, in step S701, the residual toner amount management unit 506 acquires the information on the residual amount of toner and the latest counter value of the currently used toner bottle from the image forming apparatus 102 to be monitored. Then, the management table for residual amount of toner shown in FIG. 10B is updated with the acquired information on the residual amount of toner and the latest counter value.

Next, in step S702, the residual toner amount management unit 506 determines whether the acquired information in step S701 (specifically, the bottle exchange information 608 shown in FIG. 6A) includes information indicating that the toner bottle has been replaced with a new one. If it is determined that the above acquired information includes information indicating the replacement with a new toner bottle (Yes in step S702), the residual toner amount management unit 506 advances the processing to step S704.

In step S704, the residual toner amount management unit 506 changes the delivery-completed flag of the bottle in the delivery management table of FIG. 10A to "OFF (0)", and advances the processing to step S705.

On the other hand, if it is determined in step S702 that the above acquired information does not include information indicating that the toner bottle has been replaced with a new toner bottle (Yes in step S702), the residual toner amount management unit 506 advances the processing to step S703.

In step S703, the residual toner amount management unit 506 executes a process for instructing toner bottle delivery (described later in detail), and advances the processing to step S705.

In step S705, the residual toner amount management unit 506 determines whether the information on the residual amount of all toner bottles (colors) obtained from the image forming apparatus 102 has been checked. If there is a toner bottle (color) that has not yet been checked (No in step S705), the residual toner amount management unit 506 returns the processing to step S702 and executes the processing for the next toner bottle (color).

On the other hand, if it is determined that toner bottles for all colors have been checked (Yes in step S705), the residual toner amount management unit 506 advances the processing to step S706.

In step S706, the residual toner amount management unit 506 determines whether the process of delivering toner bottles has been completed for all the monitored devices acquired in step S701. If there is a monitored device for which the process of delivering toner bottles has not been completed yet (No in step S706), the residual toner amount management unit 506 returns the processing to step S701 to continue the processing for the next monitored device.

On the other hand, if it is determined that the processing for delivering toner bottles has been completed for all monitored devices (No in step S706), the residual toner amount management unit 506 terminates the processing of this flowchart.

Figure 8:
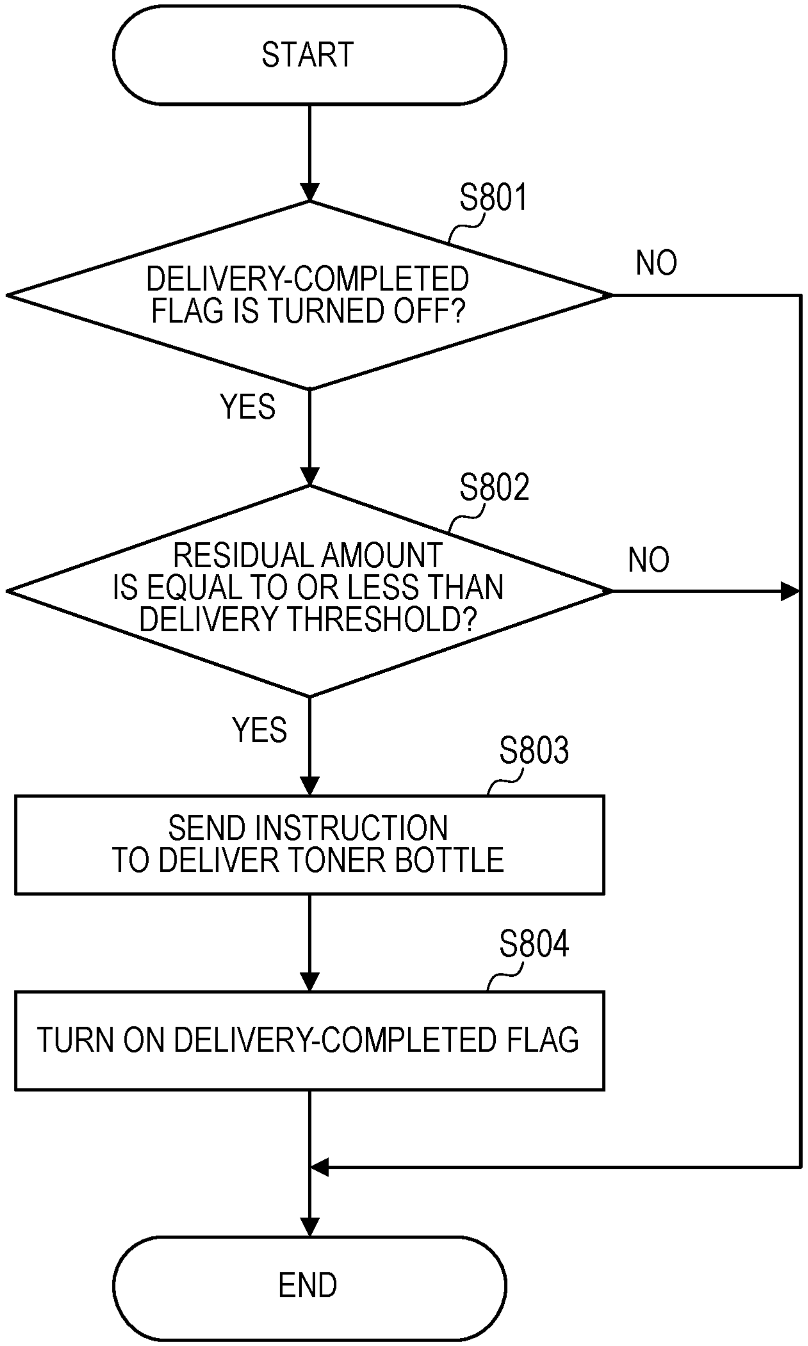
FIG. 8 is a flowchart showing the process of delivering a toner bottle executed by the management server PC.
Figure 9:
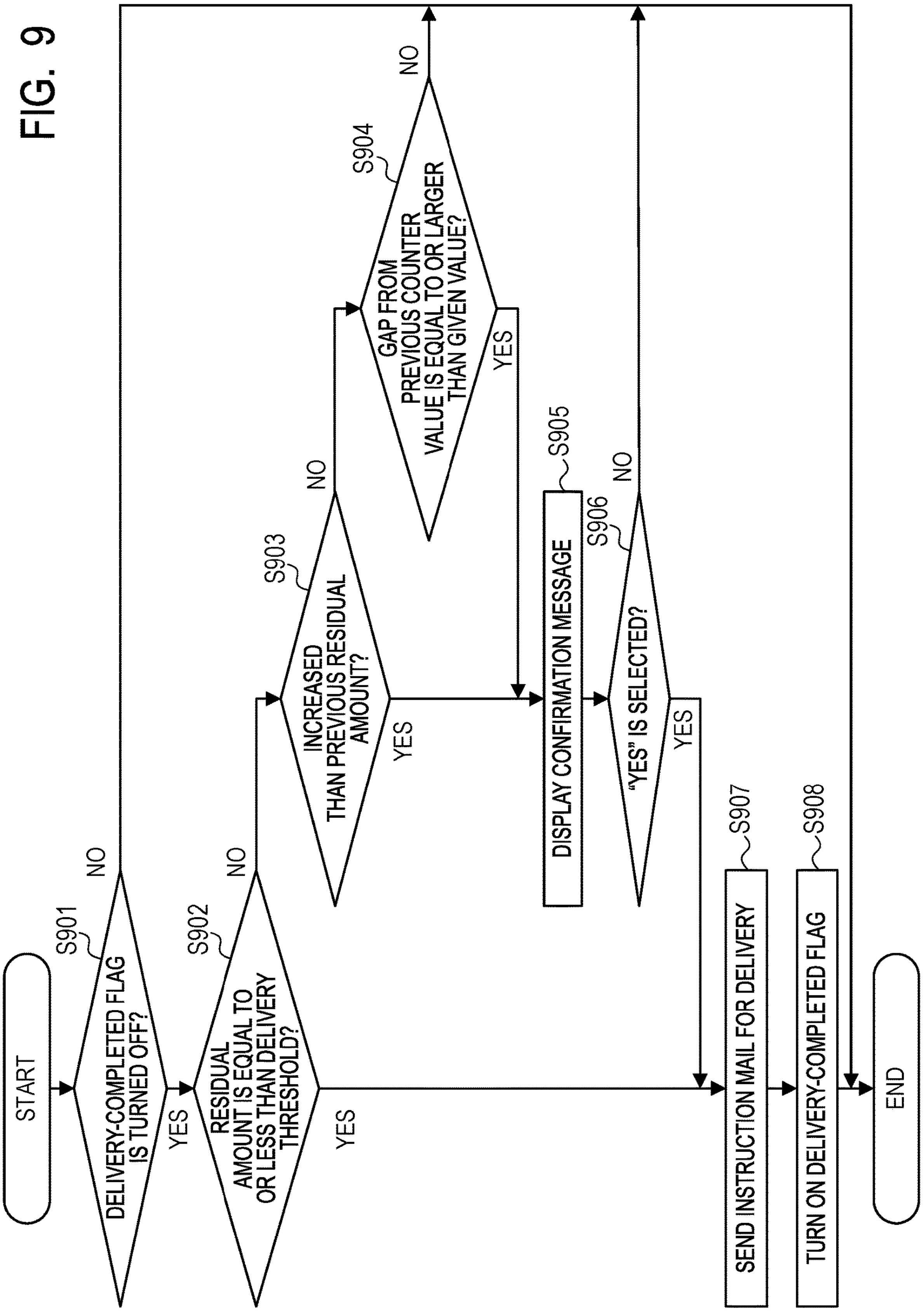
FIG. 9 is a flowchart showing the process of delivering a toner bottle executed by the management server PC.

Referring now to FIGS. 8 and 9, the details of the process of step S703 for delivering toner bottles will be described. FIG. 8 shows the processing for delivering toner bottles in the case of periodically (for example, once a day) executing the processing for acquiring the information on the residual amount of toner. FIG. 9 shows the processing for delivering toner bottles in the case of executing the processing for acquiring the information on the residual amount of toner when the management server PC 106 is booted.

FIG. 8 is a flowchart describing the details of the processing for delivering toner bottles in case that the residual toner amount management unit 506 of the management server PC 106 periodically (for example, once a day) executes the processing for acquiring the information on the residual amount of toner.

First, in step S801, the residual toner amount management unit 506 determines whether the delivery-completed flag of the bottle (color) shown in the delivery management table of FIG. 10A indicates "OFF (0)". If the delivery-completed flag indicates "ON (1)" (No in step S801), the residual toner amount management unit 506 determines that the instruction for delivering bottles for replacement has been completed (a mail instructing the delivery has been sent), and ends the process of this flowchart.

On the other hand, if the delivery-completed flag indicates "OFF (0)" (Yes in step S801), the residual toner amount management unit 506 determines that the delivery of bottles for replacement has not been instructed, and advances the process to step S802.

In step S802, the residual toner amount management unit 506 refers to the residual amount stored in the toner management table of FIG. 10B that has been updated in step S701 of FIG. 7, and determines whether the residual amount of toner obtained in the present time is equal to or less than the threshold for delivery. If the residual amount of toner acquired in the present time is larger than the threshold for delivery (No in step S802), the residual toner amount management unit 506 terminates the processing of this flowchart.

On the other hand, if the residual amount of toner acquired in the present time is equal to or less than the threshold for delivery (Yes in step S802), the residual toner amount management unit 506 advances the processing to step S803.

In step S803, the delivery management unit 507 instructs the delivery system 109 to deliver a toner bottle for replacement. Specifically, the notification management unit 504 generates a notification of requesting delivery of toner bottles, and transmits the notification to the delivery system 109 via the communication unit 501 to give a delivery instruction.

Next, in step S804, the residual toner amount management unit 506 changes the delivery-completed flag of the bottle shown in the delivery management table of FIG. 10A to "ON (1)", and ends the process of this flowchart.

FIG. 9 is a flowchart describing the details of the processing of delivering toner bottles in the case that the residual toner amount management unit 506 of the management server PC 106 executes the processing of acquiring the residual amount of toner when the management server PC 106 or the monitoring agent is booted.

First, in step S901, the residual toner amount management unit 506 determines whether the delivery-completed flag of the bottle (color) shown in the delivery management table of FIG. 10A indicates "OFF (0)". If the delivery-completed flag does not indicate "OFF (0)" (No in step S901), the residual toner amount management unit 506 determines that the instruction to deliver bottles for replacement has been completed (a mail instructing the delivery has been sent), and ends the process of this flowchart.

On the other hand, if the delivery-completed flag indicates "OFF (0)" (Yes in step S901), the residual toner amount management unit 506 determines that the instruction to deliver bottles for replacement bottle has not been given, and advances the processing to step S902.

In step S902, the residual toner amount management unit 506 refers to the residual amount stored in the toner management table of FIG. 10B that has been updated in step S701 of FIG. 7, and determines whether the residual amount of toner obtained in the present time is equal to or less than the threshold for delivery. If it is determined that the residual amount of toner acquired in the present time is equal to or less than the threshold for delivery (Yes in step S902), the residual toner amount management unit 506 advances the processing to step S907.

In step S907, the delivery management unit 507 instructs the delivery system 109 to deliver a toner bottle for replacement. Specifically, the notification management unit 504 generates a notification for requesting delivery of a toner bottle, and transmits the notification to the delivery system 109 via the communication unit 501 to give a delivery instruction.

Next, in step S908, the residual toner amount management unit 506 changes the delivery-completed flag of the bottle shown in the delivery management table of FIG. 10A to "ON (1)", and ends the process of this flowchart.

On the other hand, if it is determined in step S902 that the acquired residual amount of toner is larger than the threshold for delivery (No in step S902), the residual toner amount management unit 506 advances the processing to step S903.

In step S903, the residual toner amount management unit 506 determines whether the residual amount of toner obtained in the present time increases compared to the residual amount of the bottle obtained in the last time. Specifically, the residual toner amount management unit 506 refers to the management table for residual toner amount shown in FIG. 10B, and determines whether the residual toner amount of the bottle updated in the present time increases compared to the residual toner amount of the bottle updated in the last time.

If the residual toner amount obtained in the present time increases compared to the residual toner amount of the bottle obtained in the last time (Yes in step S903), the residual toner amount management unit 506 advances the processing to step S905.

Figure 11:
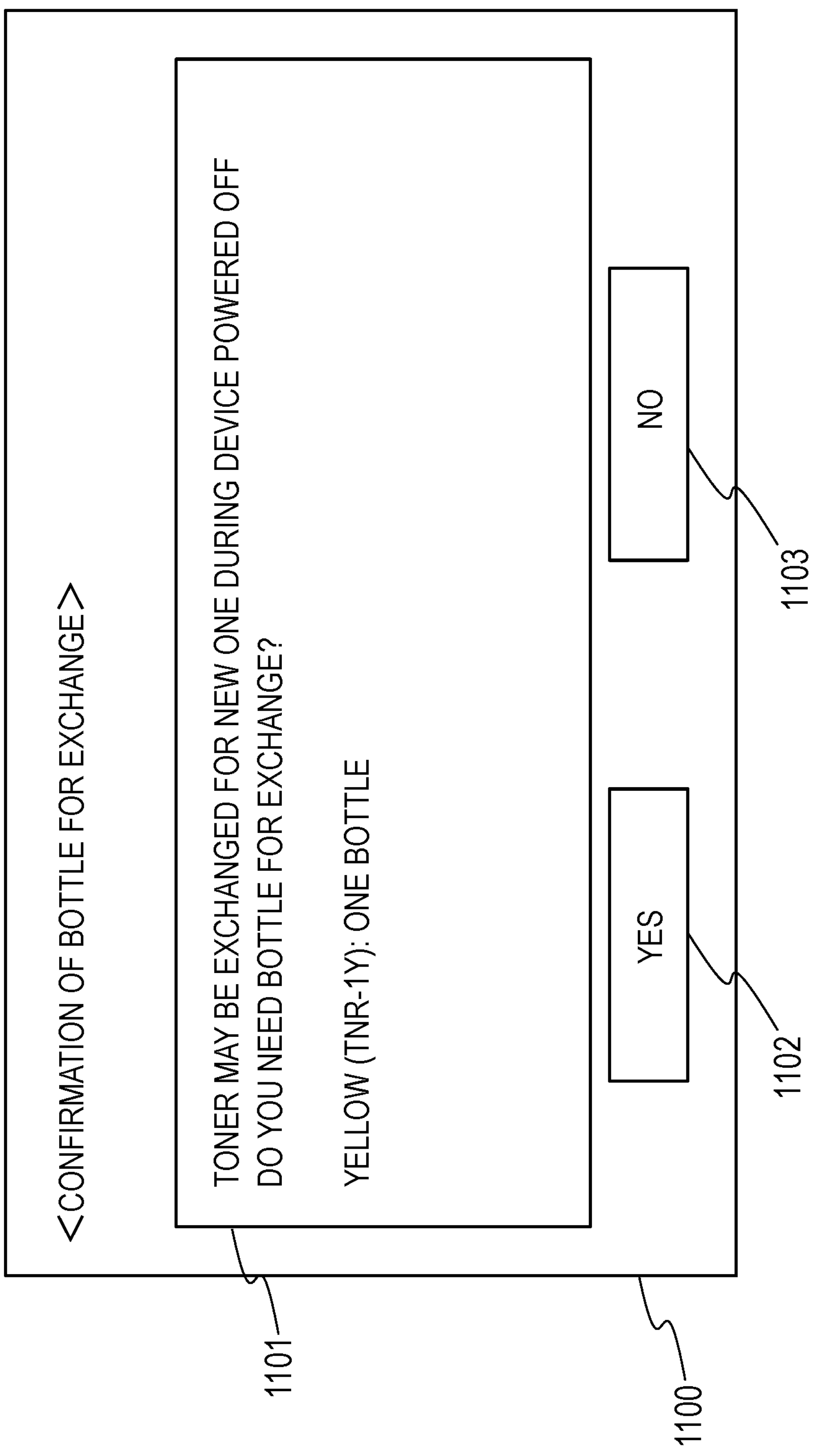
FIG. 11 shows an example of the confirmation message displayed by the management server PC.

In step S905, the residual toner amount management unit 506 displays a message for confirmation (that is, a message to a user for confirming if delivering a toner bottle for replacement is necessary) as shown in FIG. 11 on the display unit 503 of the management server PC 106. At this time, the residual toner amount management unit 506 also changes a delivery confirmation flag shown in the management table for the residual toner amount of FIG. 10B to "ON (1)".

Next, in step S906, the residual toner amount management unit 506 receives a user operation and determines whether an option such as "the delivery needed (Yes 1102)" has been selected by the user. If the user selects "the delivery needed (Yes 1102)" (Yes in step S906), the residual toner amount management unit 506 advances the processing to step S907, and instructs the delivery system 109 to deliver a toner bottle for replacement. The description for step S908 will be omitted.

If the user selects "no delivery is needed (No 1103)" (No in step S906), the residual toner amount management unit 506 terminates the processing of this flowchart.

If it is determined in step S903 that the residual toner amount has not increased compared to the residual toner amount of the bottle obtained in the previous time (No in step S903), the residual toner amount management unit 506 advances the processing to step S904.

In step S904, the residual toner amount management unit 506 determines whether there is a difference in the counter value by a certain quantity or more from the previously obtained counter value. Specifically, the residual toner amount management unit 506 refers to the management table for the residual toner amount shown in FIG. 10B, and determines whether there is a difference (increased by more than a certain quantity) between the latest counter value updated in the present time and the previously updated counter value.

If the difference in the counter values exceeds a certain value (Yes in step S904), the residual toner amount management unit 506 advances the processing to step S905, and displays the message for confirmation described above. At this time, the delivery confirmation flag shown in the management table for the residual toner amount of FIG. 10B is also changed to "ON (1)". The descriptions after step S906 will be omitted.

On the other hand, if the difference between the currently acquired counter value and the previously acquired counter value does not exceed the certain value (No in step S904), the residual toner amount management unit 506 terminates the processing of this flowchart.

As described above, the management server PC 106 according to the present embodiment gives an instruction to deliver a toner bottle for exchange if detecting that the residual amount of toner bottles that is periodically acquired from the image forming apparatus 102 to be monitored has reached a certain threshold. Further, after the management server PC 106 being booted, the management server PC 106 obtains initial information on the residual toner amount from image forming apparatuses, and compares the initial information on the residual toner amount with the previously obtained information on the residual toner amount to determine whether there is an image forming apparatus having the increased residual toner amount compared to the previously obtained information on the residual toner amount. The management server PC 106 displays a message for confirming the delivery for allowing a user to select whether the delivery of toner bottles for replacement is requested if there is such an image forming apparatus. Then, an instruction for the delivery is given to the delivery system in response to the user requesting the delivery. It is possible that the residual toner amount of the image forming apparatus 102 to be monitored reaches a threshold for delivery and the toner is replaced with a new one while the management server PC 106 is turned off or the monitoring agent is not running. In such a case, there has been a risk that the necessary delivery of toner bottles is omitted. According to the present embodiment, however, the oversight of the necessary delivery of toner bottles for replacement can be prevented even in such a case.

Second Embodiment

In the first embodiment, the delivery management table shown in FIG. 10A is managed by the management server PC 106. However, the delivery management table may be managed by the image forming apparatus 102, which is a device to be monitored. If employing the above configuration, the delivery-completed flag of the delivery management table managed by the image forming apparatus 102 is changed to "ON (1)" from the management server PC 106 side at step S804 of FIG. 8 or step S908 of FIG. 9. Further, in step S704 of FIG. 7, the delivery-completed flag of the delivery management table managed by the image forming apparatus 102 is changed and set to "OFF (0)" from the management server PC 106 side. For example, the management server PC 106 requests the image forming apparatus 102 to change the delivery-completed flag of the delivery management table to "ON (1)". In response to the above request, the image forming apparatus 102 changes the delivery-completed flag of the delivery management table to "ON (1)".

Figure 6B:
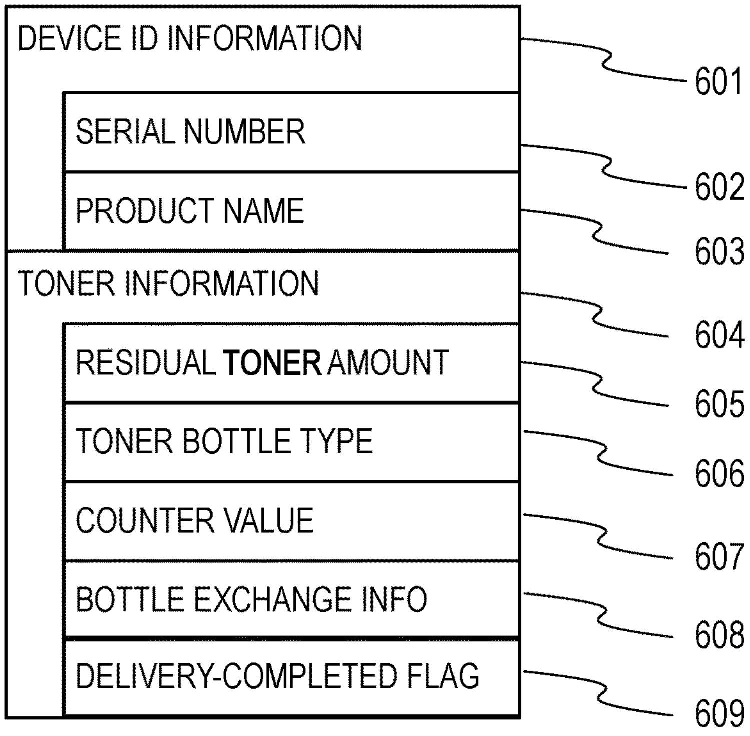
FIG. 6B shows an example of communication data of the device information received by the management server PC from the image forming apparatus.

FIG. 6B is a diagram showing an example of communication data of device information received by the management server PC 106 from the image forming apparatus 102 according to the second embodiment. Here, the information on the residual toner amount will be described as an example of the device information related to the present embodiment.

The communication data of FIG. 6B includes information of a delivery-completed flag 609, which allows the management server PC 106 to receive the information of the delivery-completed flag managed by the image forming apparatus 102 together with the residual toner amount in step S701 of FIG. 7. The residual toner amount management unit 506 of the management server PC 106 uses the information of the delivery-completed flag 609 received from the image forming apparatus 102 to determine whether the delivery-completed flag indicates "OFF" in step S801 of FIG. 8 or step S901 of FIG. 9. The above configuration can provide the same technical effect as that of the first embodiment.

As described above, according to the management system of each embodiment, the oversight (omission) of the delivery of cartridges for recording agent such as toner bottles and ink cartridges can be prevented.

The structure and contents of the various data described above are not limited to the above descriptions, and the various data may have various structures and contents depending on the use and purpose.

Although some embodiments have been described above, the present invention may be implemented as, for example, a system, apparatus, method, program, storage medium, or the like. Specifically, the present invention may be applied to a system comprising multiple apparatuses, or may be applied to a device comprising a single apparatus.

In addition, all of the configurations formed by combining the above embodiments are also included in the scope of the present invention.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-188348, filed Nov. 19, 2021, which is hereby incorporated by reference herein in its entirety.

What is claimed is:

1. An information processing apparatus executing software that obtains and manages information of a printing device, the information processing apparatus comprising:

a requesting unit configured to execute a request for a delivery of a cartridge for exchange based on residual amount of recording agent in a cartridge containing the recording agent installed in the printing device, the residual amount being included in first information obtained from the printing device by using the software; and a control unit configured to perform, when initially obtaining the residual amount of recording agent of the installed cartridge from the printing device after booting the software or the information processing apparatus and if the request for the installed cartridge has not been performed, controlling to output a message for checking whether a request for a delivery of another cartridge is necessary in response to detecting a cartridge having an increased residual amount compared to a previously obtained residual amount of recording agent.

2. The information processing apparatus according to claim 1, wherein:

the first information includes a counter value that is associated with a number of sheets printed by the printing device; and the control unit performs, when initially obtaining device information from the printing device after booting the software or the information processing apparatus, controlling to output the message for checking whether the requesting is necessary if the requesting has not been performed in response to detecting:

a cartridge having an unincreased residual amount compared to a previously obtained residual amount of recording agent; and a printing device having a counter value increased more than a predetermined value compared to a previously obtained counter value.

3. The information processing apparatus according to claim 1, wherein the requesting unit further executes a request for a delivery of another cartridge based on an instruction from a user who has checked the output message.

4. The information processing apparatus according to claim 1 further comprising a management unit configured to manage each of one or more cartridges that have been installed in the printing device by using second information indicating whether the request by the requesting unit has been executed or not, wherein the control unit determines whether the request has been executed or not based on the second information.

5. The information processing apparatus according to claim 1, wherein the software causes the information processing apparatus to function as each of the requesting unit and control unit.

6. A method of controlling an information processing apparatus executing software that obtains and manages information of a printing device, the method comprising:

executing a request for a delivery of a cartridge for exchange based on residual amount of recording agent in a cartridge containing the recording agent installed in the printing device, the residual amount being included in first information obtained from the printing device by using the software; and outputting, when initially obtaining the residual amount of recording agent of the installed cartridge from the printing device after booting the software or the information processing apparatus and if the request for the installed cartridge has not been performed, a message for checking whether a request for a delivery of another cartridge is necessary in response to detecting a cartridge having an increased residual amount compared to a previously obtained residual amount of recording agent.

7. A non-transitory computer-readable storage medium including a program executable by an information processing apparatus that obtains and manages information of a printing device, wherein the program causes a computer to function as a requesting unit and as a control unit, wherein the requesting unit is configured to execute a request for a delivery of a cartridge for exchange based on residual amount of recording agent in a cartridge containing the recording agent installed in the printing device, the residual amount being included in first information obtained from the printing device by using the software; and wherein the control unit is configured to perform, when initially obtaining the residual amount of recording agent of the installed cartridge from the printing device after booting the software or the information processing apparatus and if the request for the installed cartridge has not been performed, controlling to output a message for checking whether a request for a delivery of another cartridge is necessary in response to detecting a cartridge having an increased residual amount compared to a previously obtained residual amount of recording agent.

* * * * *